(No Model.)
A. B. WADSWORTH.
CENTERING REST OR CHUCK FOR LATHES.
No. 269,750. Patented Dec. 26, 1882.
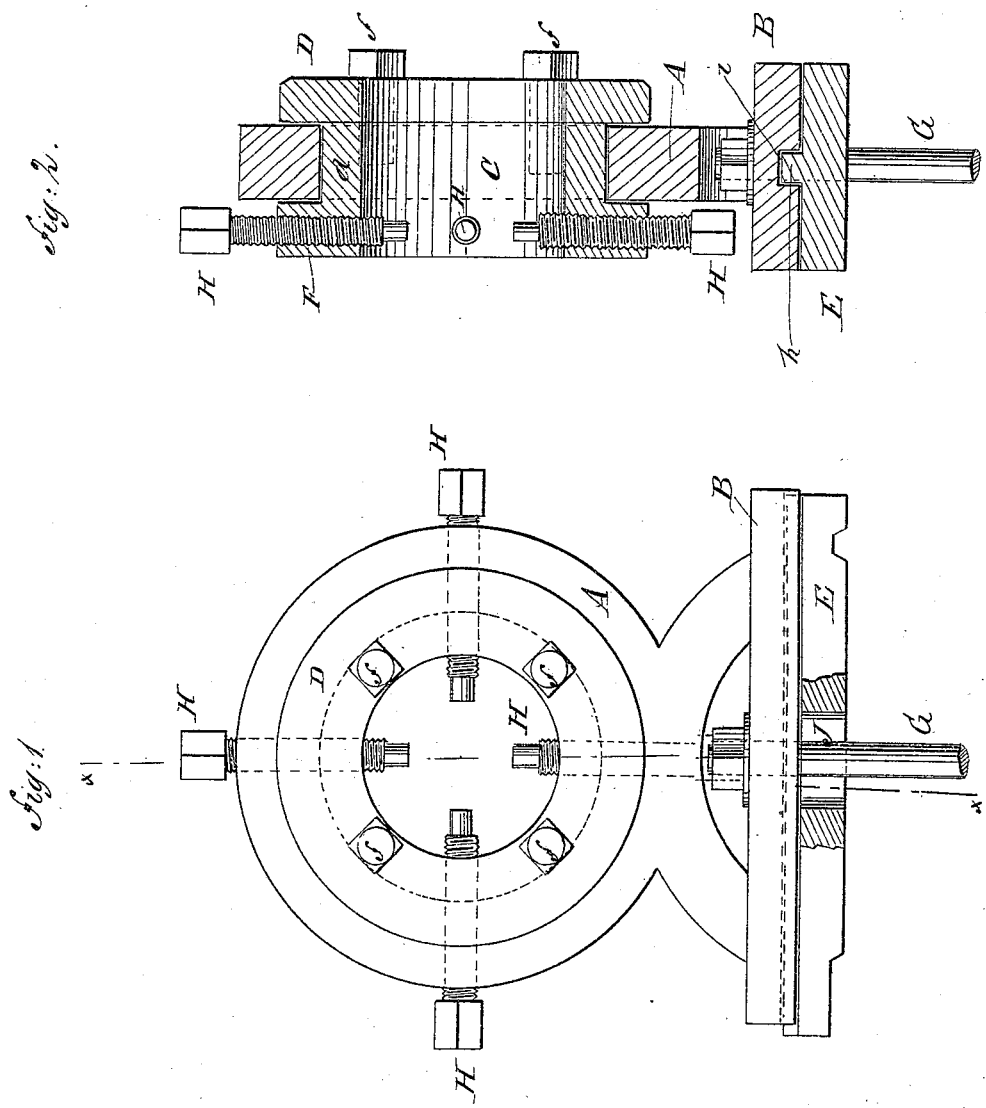
WITNESSES:
INVENTOR:
A. B. Wadsworth
BY Munn & Co
ATTORNEYS.

UNITED STATES PATENT OFFICE.

AUGUSTUS B. WADSWORTH, OF CONTOOCOOK, NEW HAMPSHIRE, ASSIGNOR OF ONE-THIRD TO WALTER S. DAVIS, OF SAME PLACE.

CENTERING REST OR CHUCK FOR LATHES.

SPECIFICATION forming part of Letters Patent No. 269,750, dated December 26, 1882.

Application filed June 2, 1882. (No model.)

*To all whom it may concern:*

Be it known that I, AUGUSTUS B. WADSWORTH, of Contoocook, in the county of Merrimack and State of New Hampshire, have invented a new and Improved Centering Rest or Chuck for Lathes, of which the following is a full, clear, and exact description.

My invention consists of a chuck or rest adapted to be attached to any lathe for holding and centering the work by means of set-screws. The rest is adapted to be adjusted laterally for turning the piece of work tapering.

Reference is to be had to the accompanying drawings, forming part of this specification, in which similar letters of reference indicate corresponding parts in both the figures.

Figure 1 is a front elevation, partly in section, of my new and improved rest or chuck; and Fig. 2 is a sectional elevation of the same, taken on the line x x of Fig. 1.

A represents a collar cast with the bed piece or plate B; and C represents a sleeve, which is formed with the bearing d to run in the collar A. The sleeve is held in the collar preferably by means of the annular plate D and screw-bolts f f.

In the flange F of the sleeve C are placed the radial set-screws H H, preferably four in number, for holding and centering the work. If the work is plain straight work, the piece is simply passed through the sleeve C and centered by testing and turning the set-screws H one way or the other, as required, which at the same time firmly secures the piece between the screws. If the work is to be tapered, the collar A is to be moved laterally one way or the other upon the plate E, and secured thereon in the proper position by the screw-bolt G, which passes up through the slot J of the plate E, and through the plate B of the collar. This screw-bolt also secures the rest or chuck upon the bed-pieces of the lathe.

The plates B and G are of the same size, and they are preferably fitted together by the tongue h and the groove i, as shown in Fig. 2, for keeping the collar A always in its proper relative position while being moved laterally.

Having thus described my invention, I claim as new and desire to secure by Letters Patent—

1. The combination, with collar A, of the annular plate D and the sleeve C, provided with the bearing d, and flange F, said flange carrying the centering device, as shown and described.

2. The combination, with the bed-plate carrying collar A, and having groove i, the flanged sleeve C, and the plate D, of the plate E, having a tongue, h, and slot J, and the screw-bolt G, as and for the purpose specified.

AUGUSTUS B. WADSWORTH.

Witnesses:
JOHN F. JONES,
ISAAC D. MERRILL.